United States Patent
Rubin et al.

(10) Patent No.: US 11,399,039 B2
(45) Date of Patent: Jul. 26, 2022

(54) AUTOMATIC DETECTION OF ILLICIT LATERAL MOVEMENT

(71) Applicant: Microsoft Technology Licensing, LLC, Redmond, WA (US)

(72) Inventors: Mor Rubin, Ashdod (IL); Moshe Ben-Nehemia, Givat-Shmuel (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 16/777,272

(22) Filed: Jan. 30, 2020

(65) Prior Publication Data
US 2021/0243208 A1    Aug. 5, 2021

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01); *H04L 63/1441* (2013.01)

(58) Field of Classification Search
CPC ............. H04L 63/1425; H04L 63/1416; H04L 63/1441
See application file for complete search history.

(56) References Cited

U.S. PATENT DOCUMENTS

| | | | |
|---|---|---|---|
| 7,475,420 B1 * | 1/2009 | Hernacki | H04L 63/0281 726/2 |
| 10,462,169 B2 * | 10/2019 | Joseph Durairaj | G06F 21/552 |
| 2017/0063897 A1 * | 3/2017 | Muddu | G06N 5/022 |
| 2017/0099306 A1 * | 4/2017 | Chiu | H04L 63/1425 |

(Continued)

FOREIGN PATENT DOCUMENTS

| WO | 2016044359 A1 | 3/2016 | |
|---|---|---|---|
| WO | WO-2016044359 A1 * | 3/2016 | ........... H04L 63/083 |

OTHER PUBLICATIONS

Liu, Qingyun, Jack W. Stokes, Rob Mead, Tim Burrell, Ian Hellen, John Lambert, Andrey Marochko, and Weidong Cui. "Latte: Large-scale lateral movement detection." In MILCOM 2018-2018 IEEE Military Communications Conference (MILCOM), pp. 1-6. IEEE, 2018. (Year: 2018).*

(Continued)

*Primary Examiner* — Noura Zoubair
*Assistant Examiner* — Afaq Ali
(74) *Attorney, Agent, or Firm* — Ogilvie Law Firm

(57) ABSTRACT

Lateral movement between networked computers is detected, and automatically and efficiently assessed by a detection tool to distinguish innocent activity from cyberattacks. By correlating log data about logins and network traffic, the detection tool produces network node sets corresponding to individual movements. If a chain can be built from node sets matching an event sequence pattern that tends to be used by attackers, then the detection tool reports the chain as an illicit lateral movement candidate. Detection patterns define illicitness grounds such as consistency of data transfer sizes, shortness of login intervals, use of suspect protocols, chain scope, and the presence or use of administrator credentials. Detection responses may then isolate computers, inspect them for malware or tampering, obtain forensic images for analysis, tighten exfiltration filtering, and otherwise mitigate against ongoing or future cyberattacks.

20 Claims, 4 Drawing Sheets

(56) References Cited

U.S. PATENT DOCUMENTS

2018/0359272 A1* 12/2018 Mizrachi ............. H04L 41/0873
2020/0380117 A1* 12/2020 Marwah ............. H04L 63/1425
2021/0029193 A1* 1/2021 Li ........................ H04L 63/083

OTHER PUBLICATIONS

Freitas, Scott, Andrew Wicker, Duen Horng Chau, and Joshua Neil. "D2m: Dynamic defense and modeling of adversarial movement in networks." In Proceedings of the 2020 SIAM International Conference on Data Mining, pp. 541-549. Society for Industrial and Applied Mathematics, 2020. (Year: 2020).*
"Mimikatz", retrieved from <<https://github.com/gentilkiwi/mimikatz>>, no later than Jan. 16, 2020, 4 pages.
"Fileless malware", retrieved from <<https://en.wikipedia.org/wiki/Fileless_malware>>, Dec. 8, 2019, 3 pages.
"10 Steps to Detect Lateral Movement in a Data Breach", retrieved from <<https://resources.infosecinstitute.com/10-steps-detect-lateral-movement-data-breach/>>, Mar. 21, 2018, 11 pages.
Christopher Kruegel, "Lateral Movement: What It Is and How to Block It", retrieved from <<https://www.lastline.com/blog/lateral-movement-what-it-is-and-how-to-block-it/>>, Jun. 20, 2019, 8 pages.
Pramod Borkar, "Detecting Suspicious Lateral Movements During a Cybersecurity Breach", retrieved from <<https://www.exabeam.com/information-security/lateral-movements/>>, Oct. 27, 2018, 12 pages.
"Lateral Movement Detection", retrieved from <<https://www.qosmos.com/cybersecurity/lateral-movement-detection/>>, no later than Jan. 16, 2020, 3 pages.
"The Imperative to Detect Lateral Movement", retrieved from <<https://cyberstartupobservatory.com/the-imperative-to-detect-lateral-movement/>>, no later than Jan. 16, 2020, 7 pages.
Derek King, "Spotting the Signs of Lateral Movement", retrieved from <<https://www.splunk.com/en_us/blog/security/spotting-the-signs-of-lateral-movement.html>>, Sep. 12, 2018, 12 pages.
"Patented Lateral Spread Detection", retrieved from <<https://blackpointcyber.com/capability/lateral-spread-detection/>>, no later than Jan. 16, 2020, 3 pages.
"GoFetch", retrieved from <<https://github.com/GoFetchAD/GoFetch>>, Jun. 20, 2017, 4 pages.
Andy Robbins, "BloodHound: How Graphs Changed the Way Hackers Attack", retrieved from <<https://neo4j.com/blog/bloodhound-how-graphs-changed-the-way-hackers-attack/>>, Apr. 17, 2019, 17 pages.

Tal Be'ery, Tal Maor, "The Industrial Revolution of Lateral Movement", retrieved from <<https://www.blackhat.com/docs/US-17/thursday/US-17-Beery-The-Industrial-Revolution-Of-Lateral-Movement.pdf>>, Jul. 22, 2017, 38 pages.
"Deathstar", retrieved from <<https://github.com/byt3bl33d3r/DeathStar>>, Sep. 2, 2019, 3 pages.
"Automating the Empire with the Death Star: getting Domain Admin with a push of a button", retrieved from <<https://byt3bl33d3r.github.io/automating-the-empire-with-the-death-star-getting-domain-admin-with-a-push-of-a-button.html>>, May 29, 2017, 5 pages.
"Windows Security Log Event ID 4624", retrieved from <<https://www.ultimatewindowssecurity.com/securitylog/encyclopedia/event.aspx?eventID=4624>>, no later than Jan. 16, 2020, 5 pages.
Oleg Kolesnikov, "Securonix Threat Research: Detecting Bad Rabbit Cyber Attack Using Security Analytics", retrieved from <<https://www.securonix.com/detecting-bad-rabbit-cyber-attack-using-security-analytics/>>, Oct. 31, 2017, 6 pages.
"Lateral Movement", retrieved from <<https://insightidr.help.rapid7.com/docs/lateral-movement>>, no later than Jan. 16, 2020, 3 pages.
"HTB: Helpline Kali", retrieved from <<https://0xdf.gitlab.io/2019/08/17/htb-helpline-kali.html>>, Aug. 17, 2019, 19 pages.
"Connect alerts from Microsoft Defender Advanced Threat Protection", retrieved from <<https://docs.microsoft.com/en-us/azure/sentinel/connect-microsoft-defender-advanced-threat-protection>>, Oct. 12, 2019, 2 pages.
Tony Lambert, "Threat Hunting for PsExec, Open-Source Clones, and Other Lateral Movement Tools", retrieved from <<https://redcanary.com/blog/threat-hunting-psexec-lateral-movement/>>, Nov. 19, 2018, 8 pages.
Rob Sobers, "CIFS vs SMB: What's the Difference?", retrieved from <<https://www.varonis.com/blog/cifs-vs-smb/>>, Jan. 23, 2019, 9 pages.
"Azure ATP Security Alerts", retrieved from <<https://docs.microsoft.com/en-US/azure-advanced-threat-protection/suspicious-activity-guide?tabs=external>>, Jan. 21, 2020, 5 pages.
Freitas, et al., "D2M: Dynamic Defense and Modeling of Adversarial Movement in Networks", In Repository of arXiv:2001.11108, Jan. 29, 2020, 9 Pages.
Liu, et al., "Latte: Large-Scale Lateral Movement Detection", In Proceedings of IEEE Military Communications Conference (MILCOM), Oct. 29, 2018, pp. 952-959.
"International Search Report and Written Opinion Issued in PCT Application No. PCT/US21/014053", dated Apr. 6, 2021, 18 Pages.

* cited by examiner

AUTOMATIC DETECTION OF ILLICIT LATERAL MOVEMENT

BACKGROUND

After a cyber attacker gains entry to a computer network, the attacker may take various actions. Confidential data may be "exfiltrated" by copying it to a location outside the network. Data may be encrypted by the attacker, to extract a ransom in exchange for the decryption key. The attacker may destroy data, or may tamper with it. Computational resources of the network such as processing power, network bandwidth, and digital storage may be hijacked, e.g., to generate or forward unsolicited emails, to mine bitcoins, or to store illicit or illegal content brought in by the attacker from outside the network.

Some attacker actions in a breached network are relatively easy to rapidly and automatically detect, but many others are not. Indeed, in some cases the presence of an attacker inside a network goes undetected for weeks or even months. Moreover, some attacks are discovered only during a manual review of device logs by overworked security personnel.

Accordingly, cybersecurity technology advances which automatically and efficiently detect the presence of attacker activity in a computer network would be helpful. Indeed, a definitive assessment that an attack is underway is not the only possible accomplishment. Even technical advances that help assess the likelihood that an attack has occurred (or is underway) could be helpful.

SUMMARY

Some embodiments described in this document provide improved technology for detecting the likely presence of attacker activity in a computer network. In particular, some embodiments detect lateral movement between networked computers. Lateral movement, also known as "network lateral movement" or "lateral spread", may be innocent authorized activity. But lateral movement also happens during cyberattacks as attackers move from computer to computer trying to capture administrator credentials or to spread malware. Some embodiments help distinguish innocent lateral movement from illicit lateral movement.

Some embodiments use or provide automatic detection of illicit lateral movement. Processing steps include (a) correlating at least login data and network traffic data, thereby producing network node sets, each network node set identifying a login event from a source computer to a target computer and also identifying a data transfer to the target computer, (b) building a chain from at least two of the node sets, the chain representing a sequence of events consistent with a pattern used by attackers, and (c) reporting the chain as an illicit lateral movement candidate.

In these embodiments, the chain's sequence of events includes: a second-computer-login into a second computer from a first computer, then a second-computer-data-transfer which transferred data from the first computer to the second computer, then a third-computer-login into a third computer from the second computer, and then a third-computer-data-transfer which transferred data from the second computer to the third computer. These embodiments are also characterized in that a second-computer-data-transfer size of data transferred from the first computer to the second computer and a third-computer-data-transfer size of data transferred from the second computer to the third computer differ by no more than ten percent of the maximum of the two transfer sizes. This may occur, e.g., because both data transfers are performed to send a given exploit payload to the target computer, such as a payload that is executed to extract passwords from volatile memory.

Some embodiments taught herein automatically correlate at least login data and network traffic data, thereby producing network node sets. Each node set identifies at least two login times for logins to respective computers of the node set, at least one administrator account on at least one computer of the node set, and at least one data transfer between computers of the node set. These embodiments build a chain from at least two of the node sets, with the chain representing a sequence of events. Then these embodiments report the chain as an illicit lateral movement candidate.

In some of these embodiments, the sequence of events includes a login to a first computer as a first user, followed by a data transfer to the first computer, followed by a login to a second computer from the first computer using an administrator credential.

In some other embodiments, each node set identifies at least two login times for logins to respective computers of the node set, and at least one administrator account on at least one computer of the node set. Data transfers are not necessarily identified or assessed. The sequence of events includes a login to a first computer as a first user, followed by a login to a second computer from the first computer using an administrator credential. These embodiments also report their chain as an illicit lateral movement candidate.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Innovations may expand beyond their origins, but understanding an innovation's origins can help one more fully appreciate the innovation. In the present case, some teachings described herein were motivated by technical challenges faced by Microsoft innovators who were working to improve the usability of Microsoft cybersecurity offerings. In particular, a technical challenge was to how to automatically and efficiently detect illicit lateral movement by an attacker in a computer network.

Lateral movement in and of itself causes little or no harm to a computer network; it consumes relatively small amounts of bandwidth and processor cycles, and does not usually—by itself—destroy or damage data. But cyber adversaries who have breached a network sometimes use lateral movements to reach additional workstations where they harvest confidential data, collect information about users and accounts, and steal access credentials for later use. Likewise, insider attacks by persons who have some authority to be on the network, but are exceeding that authority, may include lateral movements.

Figure 10:
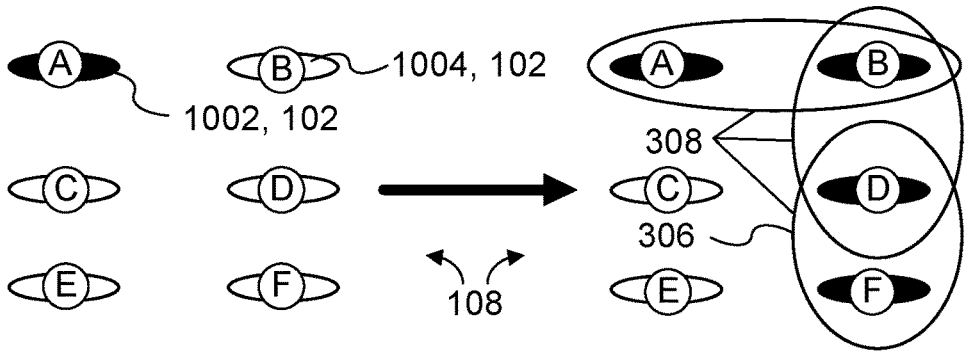
FIG. 10 is a diagram illustrating lateral movements in a network and a computed chain of node sets which represents the lateral movements.

FIG. 10 illustrates lateral movement in a hypothetical breached network. This example network has six nodes 102 as shown; the LAN or other network connections between the nodes 102 are understood to be present but to aid clarity of illustration are not shown in the drawing. Two snapshots of the six-member network are shown; time has passed between the network snapshot on the left of FIG. 10 and the network snapshot on the right of FIG. 10. Breached nodes 1002 are shown filled in, while nodes 1004 that are not breached are shown as oval outlines.

In the earlier snapshot (on the left of FIG. 10) only one node has been breached. Some time later, as shown in the snapshot on the right, four nodes have been breached. The breaches occurred as three lateral movements: from node A to node B, then from node B to node D, then from node D to node F. The nodes of each constituent movement form a node set 306, which serves as a link in a chain 308. The illustrated chain 308 has three links and includes four breached nodes 102.

Some approaches to detecting a cyberattack rely on detecting anomalies. A cybersecurity anomaly is an action or a set of actions that do not match expected behavior. What is "expected" or "normal" depends on how a given environment and its security controls are configured. For instance, an anomaly detection system using a naïve rule that says X file accesses per hour is normal could treat a spike in accesses near the end of a month as an anomaly, whereas a system using a more flexible rule that is based on logged behavior over the past several months would not treat the end-of-month spike as an anomaly. Machine learning models, collaborative filtering adaptations, and other tools and techniques have had some success detecting some departures from normal user behavior; such departures may indicate a breach in cybersecurity.

However, familiar anomaly detection approaches are unsatisfying when it comes to the detection of illicit lateral movement. Anomaly detection generally relies on the availability of a large amount of data representing normal behavior, which is not necessarily present on a newly constituted or recently reconfigured or otherwise modified network. Also, the network traffic involved in illicit lateral movement may closely resemble normal legitimate traffic, e.g., lateral movement often does not involve suspect IP addresses, suspect ports, unusual protocols, or unusual packet headers.

Some embodiments herein are consistent with the observation that adversaries sometimes try to get in and out of a breached network fast without leaving any noticeable traces. To overcome the security products that protect networks (e.g., NIDS and HIDS), cyber adversaries have created automated tools to attack as fast as possible without any interaction from human users, and without any interaction with a human attacker midway through the attack. As a result, many attacks in an organization's networks are made by automated tools. Some embodiments taught herein consider the timing of a sequence of logins when computing the likelihood that a lateral movement is illicit; a pattern of relatively fast paced logins increases a computed illicitness score.

Some embodiments herein are consistent with the observation that adversaries sometimes use malware to extract passwords, certificates, tokens, usernames, or other credentials from volatile memory, and that this malware is sent to each new target computer in turn as the lateral movements spread the attack across a network. For example, the Mimikatz tool may be sent to successive targets, for use in extracting credentials from RAM. Although Mimikatz may have legitimate uses outside the context of a cyberattack, when it is used during an attack to gain credentials without legal authority, Mimikatz is being used as malware and thus is described here as "malware". Mimikatz, is merely one example; other malware may also or instead be spread by illicit lateral movement and be used to enable more lateral movement or other attacks. Some embodiments taught herein consider the size of data transfers when computing the likelihood that a lateral movement is illicit; a pattern of consistently sized transfers indicates the same payload is being transferred each time, e.g., Mimikatz, and increases the computed illicitness score.

Teachings are provided herein to supplement or expand lateral movement detection with better functionality overall, and in particular with better functionality for detecting illicit lateral movement. In addition to short movement times and consistent data transfer sizes, other aspects of these embodiments and other lateral movement detection enhancement embodiments are also described herein.

Operating Environments

Figure 1:
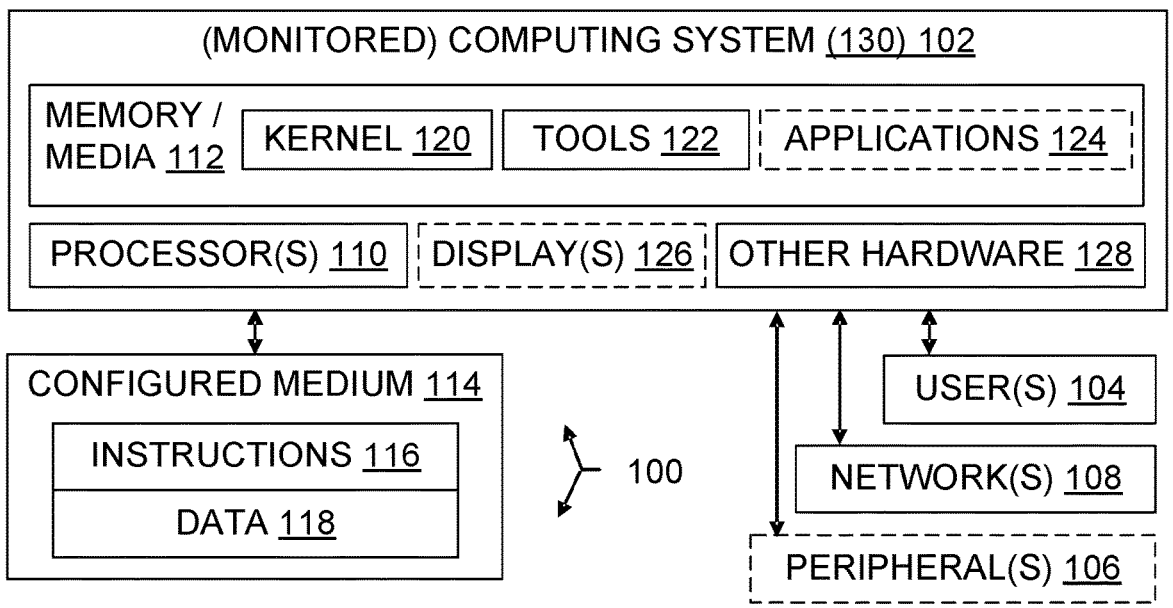
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, lateral movement detection functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
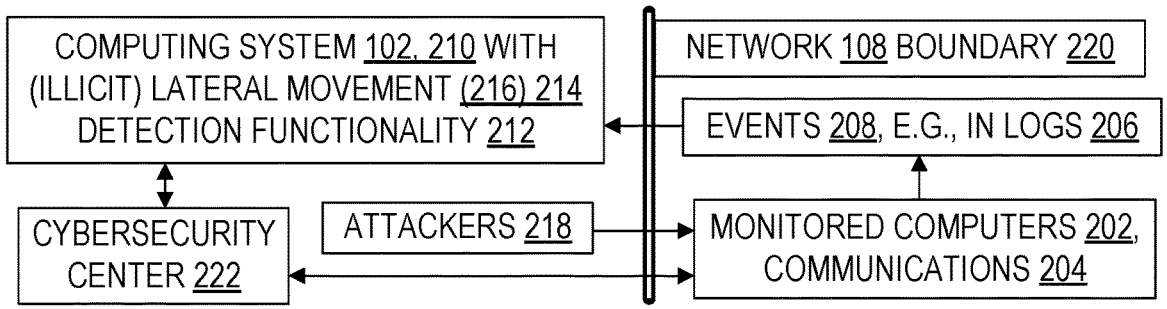
FIG. 2 is a block diagram illustrating a monitored network of computers and a lateral movement detection system.

FIG. 2 illustrates an environment having a monitored network 108, 130. The monitored network includes monitored computers 102, 202 that send or receive communications 204 over network 108 connections. Monitoring produces logs 206 that describe events 208, such as login attempts, data transfers, and other network activity.

An enhanced lateral movement detection system 210 receives the events and analyzes them as taught herein using lateral movement detection functionality 212 such as specialized software configured to operate as taught herein. The lateral movement detection functionality 212 may be designed to detect lateral movement 214 generally, and may be further tailored to detect illicit lateral movement 216 in particular.

Illicit lateral movement 216 is caused or instigated by one or more attackers 218. In the illustrated environment, the attackers 218 reside outside a network boundary 220 that is defined, e.g., by firewalls. But teachings herein may also be advantageously applied to detect lateral movement by insider attackers.

Moreover, in the illustrated environment, the lateral movement detection system 210 resides outside the monitored network 130 but in other environments a lateral movement detection system 210 resides inside the monitored network 130. Similarly, the illustrated environment shows the lateral movement detection system 210 communicating with a separately located cybersecurity center 222, but in other environments a lateral movement detection system 210 resides inside the cybersecurity center 222, or operates without any cybersecurity center 222 per se.

Figure 3:
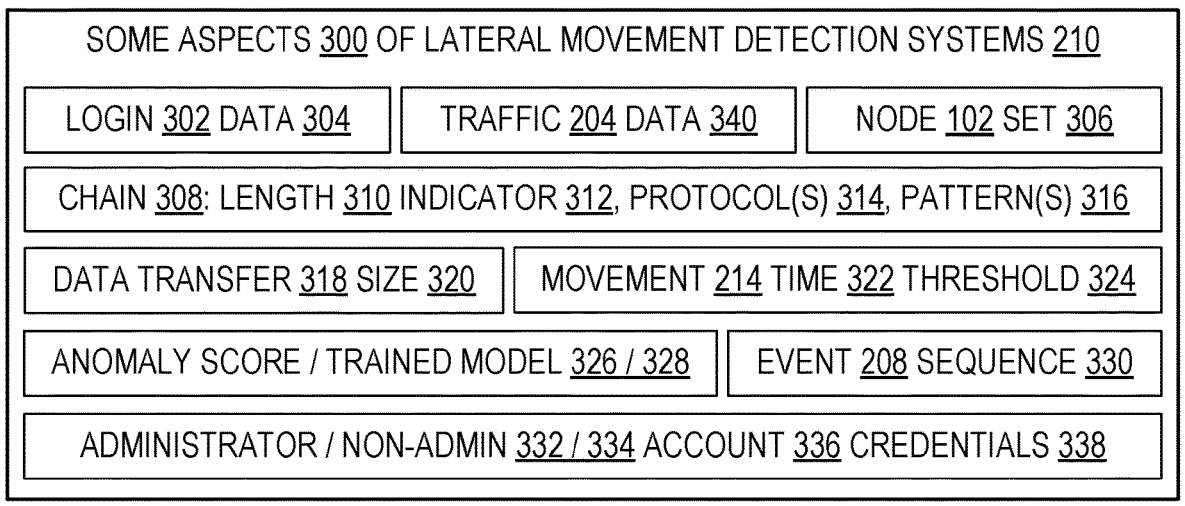
FIG. 3 is a block diagram illustrating some aspects of some lateral movement detection systems.
Figure 8:
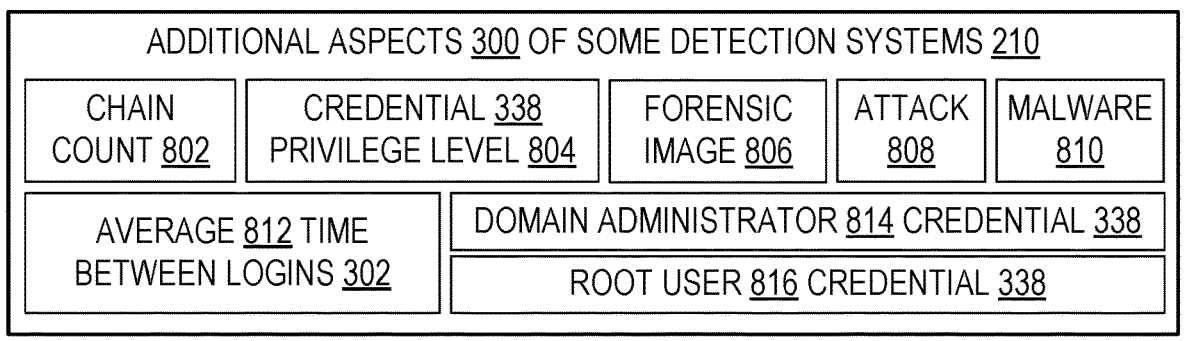
FIG. 8 is a block diagram illustrating some additional aspects of some lateral movement detection systems.

FIGS. 3 and 8 illustrate various aspects 300 of at least one lateral movement detection system 210. These aspects are discussed at various points herein, and additional details regarding them are provided in the discussion of a List of Reference Numerals later in this disclosure document.

Figure 4:
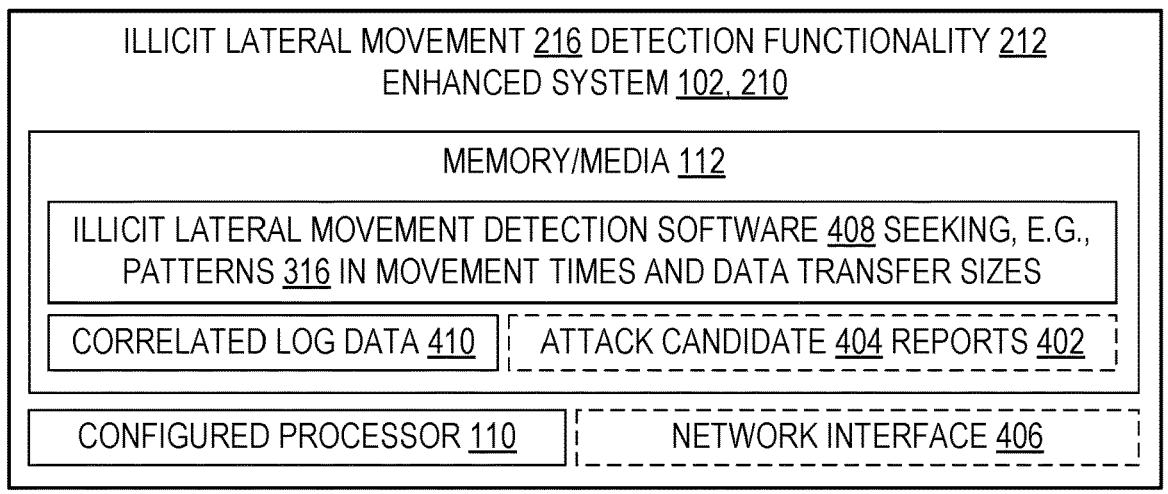
FIG. 4 is a block diagram illustrating an enhanced system configured to detect illicit lateral movement.

FIG. 4 illustrates an enhanced system 210 which is configured to produce alerts, alarms, or other reports 402 identifying likely instances of illicit lateral movement 216. These instances are also referred to as candidates 404, e.g., as "attack candidates" or "illicit lateral movement candidates". The system 210 may be networked through an interface 406.

The illustrated system 210 includes illicit lateral movement detection software 408 to perform computations that detect lateral movement 214 and help distinguish legitimate lateral movement from illicit lateral movement 216. The software 408 may utilize various patterns 316, such as a pattern of short movement times between networked computers, a pattern of consistent sizes in data transfers between networked computers, a pattern of movements ending at computers that have root user or similar powerful credentials, and other patterns that are distinguished by their reliance on grounds presented herein for computing illicitness scores.

In the illustrated system 210, the patterns 316 are based, at least in part, on analysis of correlated log data 410. Data from security logs and network traffic logs is correlated to identify certain event sequences. Correlation includes sorting log entries chronologically so the software 408 can determine an ordering of relevant events, and involves filtering log entries to focus on particular events such as logins and data transfers.

Figure 5:
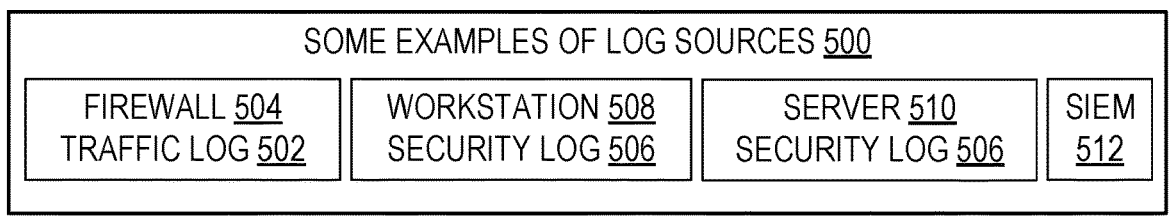
FIG. 5 is a block diagram illustrating some examples of log sources.

FIG. 5 shows some examples of log sources 500. The illustrated examples include traffic logs 502 from firewalls 504, security logs 506 from workstations 508, security logs 506 from servers 510, and security information and event management (SIEM) tools 512. SIEMs may in turn consolidate logs 206 that were generated by one or more of a firewall, workstation, server, router, FIDS, HIDS, or other devices and tools. These log sources may overlap, e.g., the same events may appear in different logs, and a given device may provide both traffic logs and security logs. Also, logs 206 may be obtained from sources that are not listed among these examples.

Figure 6:
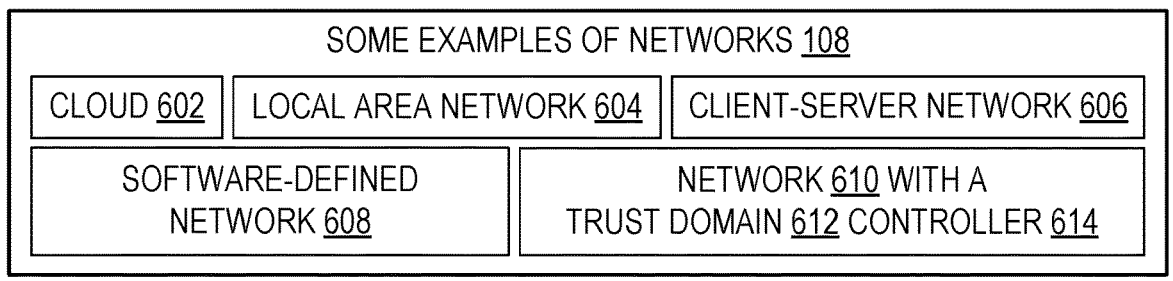
FIG. 6 is a block diagram illustrating some examples of computer networks.

FIG. 6 shows some examples of networks 108. The illustrated examples include clouds 602, local area networks (LANs) 604, client-server networks 606, software-defined networks 608, and networks 610 which have at least one trust domain 612 enforced by a domain controller 614. These network categories may overlap, e.g., a LAN may have a domain controller and also operate as a client-server network. Also, teachings herein may be applied to detect lateral movement in networks which do not happen to match any of the FIG. 6 examples.

Figure 7:
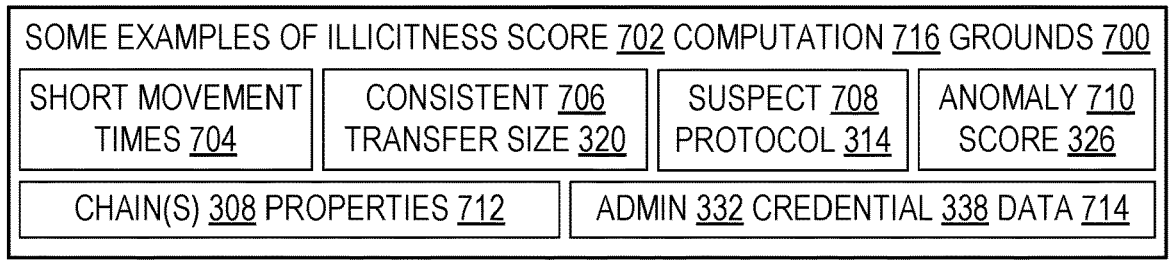
FIG. 7 is a block diagram illustrating some examples of grounds that may contribute to a computed lateral movement illicitness score.

FIG. 7 shows some examples of grounds 700 for computing 716 an illicitness score 702. The illicitness score 702 indicates the likelihood that a detected lateral movement (which may include one or more constituent lateral movements between two network nodes) is illicit. The illicitness score 702 may be a numeric value, e.g., in a range such as zero to one, zero to ten, or zero to one hundred, it the score 702 may be an enumeration value such as low, medium, or high. The illustrated examples of grounds upon which illicitness scores depend include movement times (durations) 1146, especially short movement times 704, data transfer sizes 320, especially consistent transfer payload sizes 706, certain suspect protocols 708, conventionally or otherwise detected user or node behavior anomalies 710 and corresponding anomalousness scores 326, data about chain 308 properties 712 such as the length 310 of a chain or the number 802 of chains found or whether chains 308 share a node 102, and admin data 714 about the presence or use of administrator 332 credentials 338. Definitions and examples for these grounds are discussed at appropriate points herein.

Some embodiments use or provide a functionality-enhanced system, such as system 210 or another system 102 that is enhanced as taught herein. In some embodiments, a system configured for automatic detection of illicit lateral movement includes a memory 112, and also includes a processor 110 in operable communication with the memory. The processor 110 is configured to perform steps for detecting illicit lateral movement within a network of computers.

In some of these embodiments, the steps include (a) correlating at least login data 304 and network traffic data 340, thereby producing network node sets 306. Each network node set identifies a login 302 event 208 from a source computer 102 to a target computer 102 and also identifies a data transfer 318 to the target computer.

This embodiment's steps also include (b) building a digital data structure in the form of a chain 308. The chain is built from at least two of the node sets. The chain represents a sequence 330 of events which includes: a second-computer-login into a second computer from a first computer, then a second-computer-data-transfer which transferred data from the first computer to the second computer, then a third-computer-login into a third computer from the second computer, and then a third-computer-data-transfer which transferred data from the second computer to the third computer. In this chain 308, a second-computerdata-transfer size 320 of data transferred from the first computer to the second computer and a third-computer-data-transfer size 320 of data transferred from the second computer to the third computer differ by no more than ten percent of the maximum of the two transfer sizes.

This ten percent tolerance is one example of what is meant herein by "consistent" data transfer sizes. Consistency in data transfer sizes makes illicitness more likely because lateral movement during cyberattacks 808 may include a transfer of Mimikatz or a similar malware 810 payload that is sent to a compromised system 1002 to allow a search for more credentials 338 on that compromised system. That is, during an attack the data transfers performed during lateral movement may all be about the same size because they are all carrying the same exploit payload.

In this embodiment, the enhanced system's steps also include (c) reporting the chain as an illicit lateral movement 216 candidate 404. The report 402 may then be acted upon, either automatically by an intrusion prevention system or other tool 122, or manually by a human administrator 332, to limit or otherwise mitigate harm from an attack 808.

Some embodiments use short computer-to-computer movement times 704 to identify illicit lateral movement. In some, systems are further characterized by a pattern 316 of short computer-to-computer movement times 704 in at least one of the following ways: a movement time 704 between the second-computer-login and the third-computer-login is less than a time 322 between another login to the second computer and a subsequent login to the third computer; a movement time 704 between the second-computer-login and the third-computer-login is less than an average time 812 between at least some logins 302 into computers of the network; a movement time 704 between the second-computer-login and the third-computer-login is less than a predetermined threshold 324; or a movement time 704 between the second-computer-login and the third-computer-login is less than five minutes.

Accordingly, as used here a "short" movement time 704 between two computers is a movement time 1146 that meets at least one of these patterns 316: it is faster than another pairs of logins to the two computers, faster than an average time between logins in the network of interest, faster than a predetermined threshold (which may be fixed or be dynamically adjustable by an administrator or an automatic proactive feedback loop), or faster than a predetermined fixed threshold (five minutes in the example above, two minutes in another example herein).

In some embodiments, the system is characterized by a pattern 316 of administrator logins, in that during the second-computer-login a first user logged into the second computer as an administrator 332 from the first computer, and during the third-computer-login a second user logged into the third computer as an administrator 332 from the second computer. These logins do not necessarily using the same username or credentials. The use or even the mere presence of administrator credentials in a chain 308 may be a ground 700 to increase the computed likelihood 702 that lateral movement is illicit, because one purpose of lateral movements that occur during an attack 808 is to gather administrator credentials 338.

In some embodiments, the system is characterized by a pattern 316 of consistent protocol choices in that a to-second-computer protocol 314 used to transfer data from the first computer to the second computer and a to-third-computer protocol 314 used to transfer data from the second computer to the third computer are the same protocol 314. In some of these, the protocol 314 used is also a suspect protocol 708, in that it is a protocol known to be used during illicit lateral movement 216, such as the SMB protocol.

In some embodiments, correlating at least login data and network traffic data includes correlating data 208 of a firewall traffic log 502 with data 208 of a security log 506 of at least one of the computers of the network. This may be described more succinctly as correlating the firewall traffic log 502 with the security log 506. Although some examples herein recite events 208 logged in Windows® environments, logs are not limited to those environments (mark of Microsoft Corporation).

One of skill will acknowledge that teachings herein may be beneficially applied to enhance the cybersecurity of different kinds of networks. In particular, in some embodiments the network 108, 130 of computers in which lateral movement detection is deployed includes at least one of the following: a cloud network 602, a local area network 604, a software-defined network 608, a client-server network 606, or a network 610 having at least one trust domain 612.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, mechanisms, sequences, data structures, or functionalities for instance, and may otherwise depart from the examples provided herein.

Processes (a.k.a. Methods)

Figure 9:
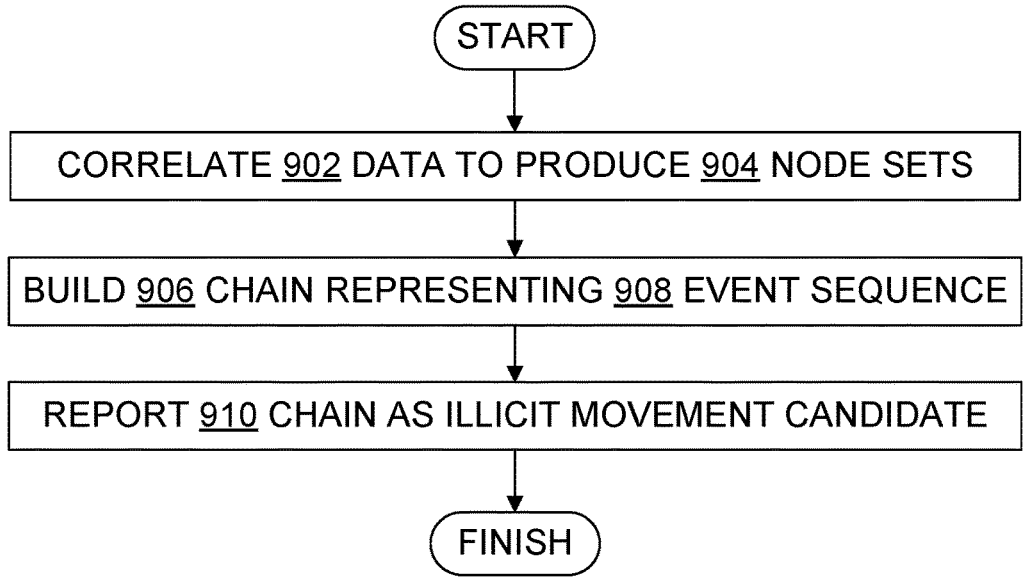
FIG. 9 is a flowchart illustrating steps in some lateral movement detection methods.
Figure 11:
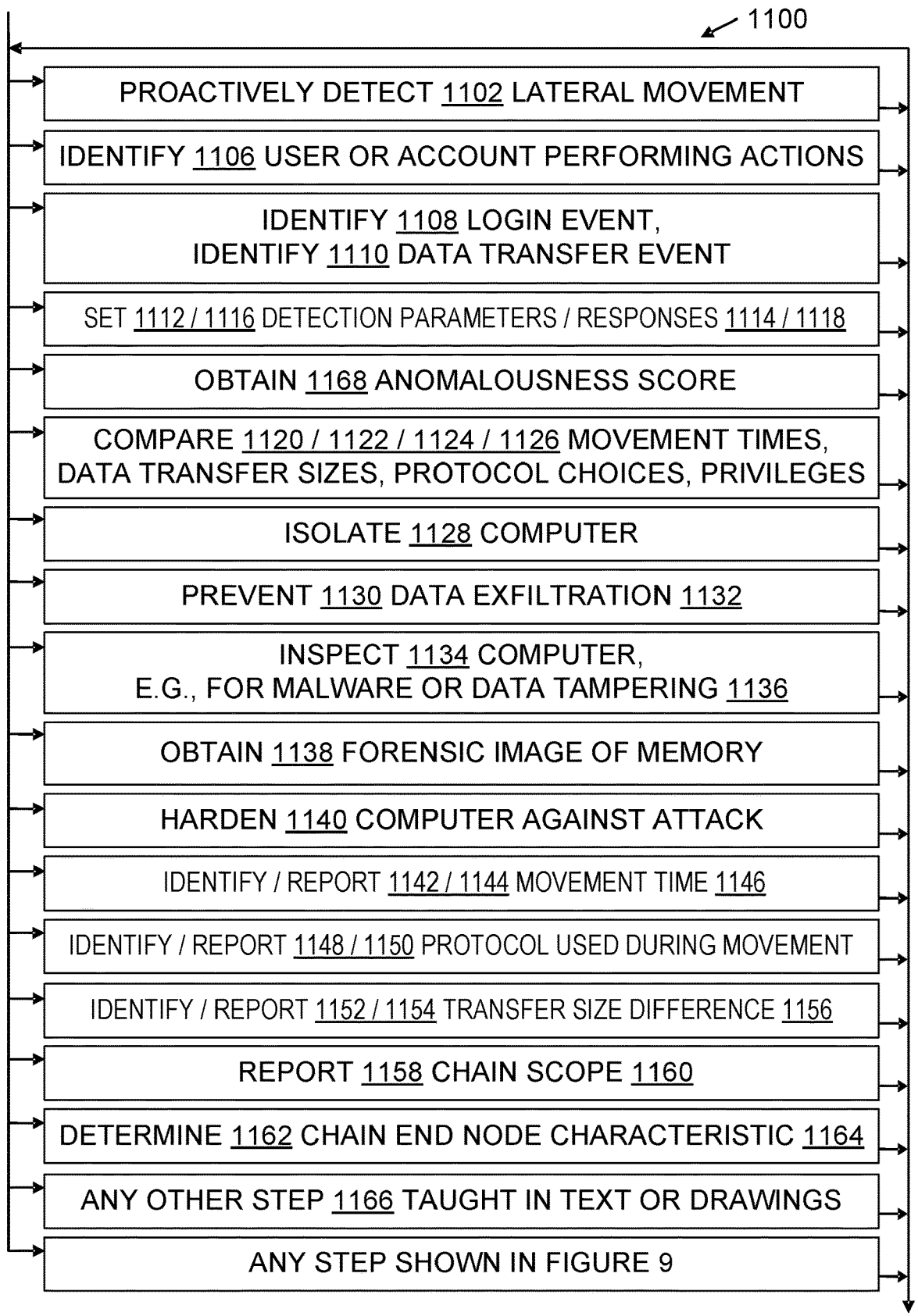
FIG. 11 is a flowchart further illustrating steps in some lateral movement detection methods.

FIG. 9 illustrates a family of methods 900 that may be performed or assisted by an enhanced system, such as system 210 or another functionality 212 enhanced system as taught herein. FIG. 11 further illustrates lateral movement detection methods (which may also be referred to as "processes" in the legal sense of that word) that are suitable for use during operation of a system which has innovative functionality taught herein. FIG. 11 includes some refinements, supplements, or contextual actions for steps shown in FIG. 9. FIG. 11 also incorporates steps shown in FIG. 9.

Technical processes shown in the Figures or otherwise disclosed will be performed automatically, e.g., by an enhanced SIEM tool 122, 210, unless otherwise indicated. Processes may also be performed in part automatically and in part manually to the extent action by a human administrator or other human person is implicated, e.g., in some embodiments a human administrator may specify a movement time threshold value 324. No process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 9 and 11. Steps may be performed serially, in a partially overlapping manner, or fully in parallel. In particular, the order in which flowchart 900 action items or flowchart 1100 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method of detecting illicit lateral movement within a computer network, including the following automatic steps: correlating 902 at least login data and network traffic data, thereby producing 904 network node sets 306, each node set identifying: at least two login 302 times 322 for logins to respective computers of the node set, at least one administrator account 336 on at least one computer of the node set, and at least one data transfer 318 between computers of the node set; building 906 a chain 308 from at least two of the node sets, the chain representing a sequence 330 of events, the sequence of events including a login 302 to a first computer as a first user, followed by a data transfer 318 to the first computer, followed by a login 302 to a second computer from the first computer using an administrator credential; and reporting 910 the chain as an illicit lateral movement candidate.

In some embodiments, reporting 910 the chain as an illicit lateral movement candidate includes reporting an illicitness score 702 that was also computed 716 by the method. In some, the illicitness score computation 716 is based at least in part on at least two of the following listed grounds 700: a movement time 1146 between logins to adjacent computers in the chain; a difference between a transfer size 320 of data transferred to a computer in the chain and a transfer size 320 of data transferred from that computer; at least two protocol 314 choices of how to transfer data to at least two of the computers in the chain; a chain length indication 312 indicating that more than three computers are in the chain; a presence of multiple chains 308 which share at least one computer; or an anomalousness score 326 based at least in part on previous communications 204 between at least two computers in the chain. Some embodiments use at least three of these grounds 700 to compute 716 an illicitness score; some use at least four of these grounds; some use more.

One of skill will acknowledge that various mitigations can be made after illicit lateral movement is detected. Some embodiments include at least one of the following responses 1118 to the reporting 910: isolating 1128 one of the computers from communication with the network; preventing 1130 exfiltration 1132 of data from at least one of the computers; inspecting 1134 at least one of the computers for malware 810; inspecting 1134 at least one of the computers for a data integrity violation 1136; obtaining 1138 a forensic image 806 of volatile memory of at least one of the computers; obtaining 1138 a forensic image 806 of non-volatile memory of at least one of the computers; or hardening 1140 at least one of the computers against a cyberattack 808.

In some embodiments, reporting 910 includes reporting 1144 a movement time 1146 between logins to adjacent computers in the chain. In some, reporting 910 includes reporting 1154 a difference 1156 between a transfer size of data transferred to a computer in the chain and a transfer size of data transferred from that computer. In some, reporting 910 includes reporting identifying 1148 a particular data protocol 314 as being used to transfer data to at least two of the computers in the chain. In some, reporting 910 includes reporting 1158 on chain scope 1160, which may include an indication 312 that more than two node sets are in the chain 308, a chain length 310 indicating how many computers more than three are in the chain, or a chain count 802 indicating how many chains have been built. In this example, each chain considered is based on a sequence of logins using or providing administrator account access.

Some embodiments, obtain 1168 from a trained machine learning model 328 an anomalousness score 326 which is based at least in part on previous communications between at least two computers in the chain. For example, neural networks, deep neural networks, modified collaborative filters, decision trees, clustering, and other machine learning tools and techniques can be applied to events 208 to identify likely anomalies 710, even without the benefit of all the teachings provided herein. The resulting anomalousness scores 326 can then be combined, e.g., in a weighted average, with other grounds 700 to compute an illicitness score 702.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as lateral movement detection software 408, login data 304, traffic data 340, chains 308, illicitness scores 702, and candidate reports 402, in the form of data 118 and instructions 116, read from a removable storage medium 114 and/or another source such as a network connection, to form a configured storage medium. The configured storage medium 112 is capable of causing a computer system 102 to perform technical process steps for lateral movement detection (especially steps for illicit lateral movement detection), as disclosed herein. The Figures thus help illustrate configured storage media embodiments and process (a.k.a. method) embodiments, as well as system and process embodiments. In particular, any of the process steps illustrated in FIG. 9 or 11, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for detecting illicit lateral movement within a computer network. This method includes: correlating 902 at least login data and network traffic data, thereby producing network node sets, each node set identifying 1108 at least two login times for logins to respective computers of the node set, and also identifying 1106 at least one administrator account on at least one computer of the node set; building 906 a chain from at least two of the node sets, the chain representing a sequence of events, the sequence of events including a login 302 to a first computer as a first user, followed by a login 302 to a second computer from the first computer using an elevated token or other administrator credential; and reporting 910 the chain as an illicit lateral movement candidate.

In some embodiments, building 906 the chain includes determining 1120 that a movement time between two login times is less than two minutes. In other embodiments, the cutoff is five minutes instead of two minutes.

In some scenarios, an attacker 218 will stop trying to extend a set of breached machines to search for credentials when the attacker gets a powerful credential such as a domain admin 814 password 338. The compromised machine 102 containing the powerful credential may still login to other computers but there will no longer need to be a data transfer of the kind used in the credential search (e.g., a data transfer to load Mimikatz). Thus, in some embodiments, building the chain includes determining 1162 that a pattern 316 of consistent computer-to-computer data transfer sizes 320 ends at a computer 102 which contained at least one of the following: a domain administrator 814 credential 338, or a root user 816 credential 338.

In some scenarios, an attacker 218 will stop trying to extend a set of breached machines to search for credentials when the attacker reaches a machine X that does not contain any elevated token or other admin credential for Mimikatz or other malware to misappropriate. Thus, in some embodiments, building the chain includes determining 1162 that a computer X at an end of the chain did not contain any credential 338 which has a higher privilege 804 than a credential used by a previous computer in the chain to login to the computer X.

In some embodiments, building the chain includes determining 1148 that a login between two computers utilized a server message block protocol.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide an automated movement detector. Many adversaries use automated tools to harvest credentials 338 and move 214 between different workstations 102 in an organization, so detecting that movement can improve cybersecurity. In some embodiments, an automated movement detector 210 detects those automated attacks by correlating firewall traffic logs with Windows® security logs to find lateral movement paths used by automated tools (mark of Microsoft Corporation).

As a security log event example, Windows® security event 4624 with logon type 3 (network connection) contains the connected username to a machine 102 from another machine 102, the logon method (e.g., NTLM or Kerberos) and a flag that indicates whether the opened network session opened as admin session. Firewall traffic logs contain the source IP address, destination IP address, destination port and the amount of data transferred in the session, within a 10% tolerance.

By correlating 902 both kinds of log events to match data transfers with logins, an embodiment can get correlated event results, e.g., data 410 showing that a source IP made a network login to a destination IP using a certain user which is an admin on the destination, with a data volume 320 for the session. The correlation 902 may be made, e.g., by matching the computer's own Windows® security event 4624 with the destination IP in the Firewall traffic log, matching the logon method from Windows® security event 4624 with the destination port from the firewall traffic log (e.g., NTLM with port 445/80 TCP, Kerberos with port 88 UDP or TCP), and matching the event time. The correlated event indicates possible movement 214 from source computer to destination computer. The movement might be a result of an adversary 218 harvesting credentials from the destination machine using the administrative session, by using tools like Mimikatz.

The correlated event may be represented, e.g., as a directed graph with two nodes. Such a graph may be represented visually with nodes and links, or textually, e.g., as: (computer A, user X)->(computer B, user X is admin), where paired parentheses indicate a node and "->" indicates a directed link. Visual representations may be favored in a detector 210 graphical user interface, while textual representations are favored in detector logs or scripts or processing, for example. Additional correlations may produce additional nodes and links, and permit a chronological ordering of the moves represented by the nodes and links. By matching a source IP of one graph with a destination IP of another graph, graphs may be connected to form larger graphs. Correlation may also consider the transfer volume of moves represented in graphs, e.g., where the timestamp from the destination IP of one sub-graph is earlier than the timestamp on the source IP in the other sub-graph.

Such correlation may result in a directed graph with at least two nodes, where the first sub-graph will be connected to the second sub-graph and the second sub-graph represents movement after the movement represented by the first sub-graph generated. One such graph may be described textually as: (computer A, user X)->(computer B, user X is admin, user Z)->(computer C, user Z is admin); (computer A, user X)->(computer D, user X is admin). Notice that in this example, movement 214 occurred from node A in two directions: one path is A->B->C, and another path is A->D. Of course, these are merely examples. In a production setting, movement detection building may construct a graph with many different paths and a different number of nodes in each path.

In some embodiments, each chain 308 (which may be considered a final correlated event) contains at least one path with at least three nodes 102. Such events may represent detection of some or all of the paths followed from one IP address to another using an automated tool 810 for lateral movement.

Some embodiments search for user logins and check to see if the user logged in will have an administrator session, which means that it can pull passwords from the remote computer it logged into. Some embodiments learn the paths created and note which users from which computers usually do movements, and use anomaly detection try to reduce the number of false positive lateral movement reports. Some implement the functionality 212 as part of a security infrastructure, particularly in clouds 602.

Some embodiments use or provide a method of detecting unauthorized lateral movement within a computer network, including automatically: correlating 902 at least logon data and network traffic data, thereby producing network node pairs, each network node pair identifying a logon event from a source computer to a target computer; building 906 a chain from at least two of the node pairs, the chain representing a sequence of events, the sequence of events including: a first user logged into a second computer as an administrator from a first computer, and then a second user logged into a third computer as an administrator from the second computer; and reporting 910 the chain as an unauthorized lateral movement candidate.

In some embodiments, building 906 the chain includes confirming that a first amount of data which was transferred from the first computer to the second computer is within a specified tolerance of a second amount of data which was transferred from the second computer to the third computer.

In some embodiments, building 906 the chain includes ascertaining that the second user logged into the third computer within a specified time of when the first user logged into the second computer.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as lateral movement detection through correlation and filtering of events in a monitored computing system, comparing 1120 inter-computer movement times, comparing 1122 data transfer sizes 320, and identifying 1124 computer protocols 314, which are each activities deeply rooted in computing technology. Some of the technical mechanisms discussed include, e.g., chain 308 data structures, digital resource access credentials 338, malware 810, forensic images 806, and chain end node characteristics 1164. Some of the technical effects discussed include, e.g., detection 1102 of lateral movements, differentiation of licit lateral movements 214 from illicit lateral movements 216, and hardened 1140 computing systems 130. Thus, purely mental processes are clearly excluded. Other advantages based on the technical characteristics of the teachings will also be apparent to one of skill from the description provided.

Some embodiments described herein may be viewed by some people in a broader context. For instance, concepts such as attacks, correlation per se, detection per se, monitoring, movement, and security, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively assess the likelihood that certain logins and data transfers are part of a cyberattack. Other configured storage media, systems, and processes involving attacks, correlation, detection, monitoring, movement, and security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, communication protocols, operating system environments, feature examples, software processes, development tools, malware, identifiers, data structures, data organizations, notations, control flows, pseudocode, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HIDS: host intrusion detection system
HTTP: hypertext transfer protocol; unless otherwise stated, HTTP includes HTTPS herein
HTTPS: hypertext transfer protocol secure
IaaS or IAAS: infrastructure-as-a-service
ID: identification or identity
IoT: Internet of Things
IP: internet protocol
LAN: local area network
NIDS: network intrusion detection system
NTLM: new technology LAN manager
OS: operating system
PaaS or PAAS: platform-as-a-service
RAM: random access memory
ROM: read only memory
SIEM: security information and event management; also refers to tools which provide security information and event management
TCP: transmission control protocol
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" is any user that has legitimate access (directly or indirectly) to multiple accounts of other users by using their own account's credentials. Some examples of administrators include network administrators, system administrators, domain administrators, privileged users, service provider personnel, and infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Lateral movement detection operations such as extracting events 208 by reading and filtering logs 206, correlating 902 events 208, building 906 chain data structures, computing 716 illicitness scores 702, obtaining 1138 forensic images of memory 112, and many other operations discussed herein, are understood to be inherently digital. A human mind cannot interface directly with a CPU or other processor, or with RAM or other digital storage, to read and write the necessary data to perform the lateral movement detection steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as building, comparing, correlating, detecting, determining, hardening, identifying, inspecting, isolating, obtaining, preventing, reporting, setting (and builds, built, compares, compared, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as a "computational system" or "computing system", and when in a network may be referred to as a "node"
104 users, e.g., user of a monitored system 130
106 peripherals
108 network generally, including, e.g., LANs, WANs, software-defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
130 monitored computer network, e.g., a system 102 whose resources or activity or both are logged, traced, analyzed, or otherwise monitored to provide or optimize cybersecurity
202 monitored computers, e.g., computers 102 (nodes 102) in a monitored computer network 130
204 communications between computers; may also be referred to as "traffic" or "packets", for example
206 logs, namely automatically created records of certain events in a computing system; may be in a syslog format, or another format
208 event; may also be referred to as an "entry" or set of entries in a log or as data 208
210 lateral movement detection system
212 lateral movement detection functionality, e.g., software 408 or data structures used by or generated by software 408, chains 308
214 lateral movement generally
216 illicit lateral movement, e.g., lateral movement performed by a external or insider attacker who is acting beyond the scope of the authority (if any) granted to them by the owner of a monitored network
218 attacker, e.g., a person or automation who is acting within a network beyond the scope of the authority (if any) granted to them by the owner of the network; may be external or an insider; may also be referred to as an "adversary"

220 network boundary, e.g., as defined by routers or gateways or IP address assignments; may also be referred to as network "perimeter"

222 cybersecurity center; may also be referred to as a "security operations center" or SOC; may be formally designated in an organizational chart, or may be implicit in the assigned duties of personnel, or both 300 some aspects of some lateral movement detection systems, methods, and functionality 302 login; may refer to the act of logging in (a.k.a., "logging on"), or to a memorialization of that act in a log 304 data about one or more logins, e.g., when they occurred, which username was used, which computer was logged into 306 set of nodes 102 involved in a movement 214

308 chain data structure representing at least a login from one computer to another computer; may also represent associated items such as how much data was transferred between the computers, and what protocol(s) were used 310 length of a chain; may be measured in nodes 102 (i.e., computers 102), or be measured in constituent movements 214 between pairs of computers 312 chain length indicator; may be a number with an express or implicit unit, e.g., "a chain of five computers", "a chain of four movements", or may indicate a range, e.g., "at least three computers", or may be an enumeration value, e.g., "short", "medium", or "long" with underlying numeric definitions 314 computer protocol, e.g., TCP, IP, UDP, HTTP, SMB, Kerberos 316 pattern used in detecting illicit lateral movement; may be, e.g., a pattern of short times between logins to successive computers, a pattern of consistent data transfer sizes, or any other pattern discussed herein 318 data transfer may refer to the act of transferring data to computer or may refer to a memorialization of that act in a log; "transfer" does not imply removal of an original, but rather is used interchangeably with "transmit" or "send a copy"

320 data transfer size; may also be referred to as data "volume"; may be measured in bytes, sectors, or blocks, for example 322 without qualifiers refers to time generally; presumptively refers to a duration, which may be measured in microseconds, processor cycles, system ticks, or other unit; may also refer to a point in time, e.g., a point represented by a timestamp; when qualified may also refer to a "movement time" which is measured from a login at a source computer to a login from that source computer to a destination computer, unless indicated otherwise 324 movement time threshold, e.g., a limit on how short a movement time must be to qualify as "short"

326 cybersecurity anomaly score; may also be referred to as an "anomalousness score"

328 model trained for cybersecurity anomaly detection; input data for training may include tuples of the form (user, resource, dailycount), for example, where dailycount is the number of times user accessed resource in a given day; model may include any machine learning model 330 sequence of events 208

332 administrator 334 non-administrator 336 account, e.g., a set of computational resources which are accessed upon presentation of credentials 338 credentials, e.g., usernames, passwords, digital certificates, tokens 340 traffic data, e.g., as found by a packet sniffer or in traffic logs 402 report identifying at least an attack candidate, such as a set of lateral movements that are suspect 404 an attack candidate, such as a set of lateral movements that are suspect 406 interface to a system 210; may include, e.g., shells, graphical or other user interfaces, network addresses, APIs, network interface cards, ports 408 lateral movement detection software; may implement any of the methods 900, 1100 or any of the functionality 212, for example 410 log data correlated with traffic data to represent movement 214

500 source of a log 206

502 traffic log, e.g., as produced by packet captures or generated by agents or tools such as a NIDS 504 firewall or any device having firewall functionality 506 security log, e.g., as generated by agents or tools such as a HIDS 508 workstation, e.g., a tower, laptop, tablet, smartphone, or other node 102 that is generally used by one person at a time 510 server, e.g., a computer in a server-client network that provides a service to multiple workstations as clients

512 SIEM 602 cloud; may also be referred to as a "cloud computing environment"

604 local area network (LAN)

606 client-server network 608 software-defined network 610 network which has a Windows® domain controller or other trust domain controller (mark of Microsoft Corporation)

612 trust domain 614 trust domain controller 700 ground for computing an illicitness score 702 illicitness score; may be numeric, or be an enumeration such as "low" or "high", "legitimate" or "suspect", or the like 704 short movement time; what qualifies as short is defined by context, with the understanding that if no context indicates differently than "short" means less than two minutes 706 consistent data transfer sizes; what qualifies as consistent is defined by context, with the understanding that if no context indicates differently than "consistent" means with less than ten percent difference 708 suspect protocol; what qualifies as suspect is defined by context, with the understanding that if no context indicates differently than "suspect" means SMB (server message block)

710 cybersecurity anomaly 712 property of one or more chains, e.g., the length of a chain or the number of chains found or whether chains share a node 714 data about one or more administrator credentials, such as whether they were present on a given node, whether they were used in a login, and their relative privilege level 716 computation of a illicitness score; also refers to the act of computing an illicitness score
802 number of chains 308
804 relative privilege level of a credential, e.g., whether it is a low-level non-admin 334 credential or an intermediate-level admin 332 credential or a high-level root user 816 credential
806 forensic image of memory content; need not include all content of the memory
808 cyberattack, e.g., a prior or ongoing intrusion into a network which is not expressly authorized by the network's owner
810 malware; includes software designed for cyberattacks as well as software not expressly designed for cyberattacks but nonetheless used or being used as a tool in a cyberattack
812 average time between logins
814 domain administrator
816 root user
900 flowchart; 900 also refers to lateral movement detection methods illustrated by or consistent with the FIG. 9 flowchart
902 correlate login data with traffic data to obtain movement data
904 produce movement data, e.g., generate or populate a data structure representing a node set 306
906 build a chain 308 representing at least one movement 214, e.g., by generating or populating a chain data structure
908 represent at least one movement 214 as a sequence of events
910 report a chain, e.g., by displaying on a screen 126, raising an alert, sending a email or text or voicemail
1002 breached node
1004 unbreached node
1100 flowchart; 1100 also refers to lateral movement detection methods illustrated by or consistent with the FIG. 11 flowchart (which incorporates the steps of FIG. 9)
1102 detect lateral movement
1106 identify a user or an account (or both) that is performing actions such as logins or data transfers
1108 identify a login event, e.g., by scanning a security log
1110 identify a data transfer event, e.g., by scanning a traffic log
1112 set detection parameters, e.g., through an interface or as defaults
1114 detection parameters, e.g., cutoff 324 for short movement time, tolerance for data transfer sizes, minimum number of computers in a chain, list of suspect protocols (or list of non-suspect protocols, or both), and network 130 to monitor
1116 set detection responses, e.g., through an interface or as defaults
1118 detection responses, e.g., raising an alert, isolating 1128 computers in the chain from the rest of their network, isolating 1128 all computers in the monitored network from the internet or from internal networks or both, obtaining 1138 forensic images of memory of one or more computers in the chain, running 1134 antivirus scans, tightening 1130 exfiltration prevention mechanisms, or otherwise hardening 1140 a monitored network
1120 compare movement times, e.g., by comparing timestamps to calculate a movement duration, or by comparing movement duration to a threshold or an average
1122 compare data transfer sizes, e.g., to check whether they differ by more than a specified tolerance (10% unless set 1112 otherwise)
1124 compare protocol choices, e.g., by comparing traffic data against a list of suspect protocols
1126 compare credential privileges, e.g., by checking a credential against a list or other definition of root user credential characteristics
1128 isolate one or more computers from at least some further networked communication; isolation 1128 allows but does not require that an isolated computer be completely air-gapped
1130 prevent data exfiltration, e.g., by scanning network traffic for keywords; exfiltration prevention allows but does not require that all exfiltration be prevented
1132 exfiltrate data from a network to a location outside the network
1134 inspect a computer, e.g., by scanning for malware or by checking timestamps or checksums or hashes or other indicia of possible data tampering
1136 data tampering, e.g., unauthorized changes in data values which may occur as corruption, deletion, encryption, or other changes
1138 obtain a forensic image of a memory, e.g., one that is suitable as evidence in later proceedings in the relevant jurisdictions or venues
1140 harden a computer against attack, e.g., by disabling or removing accounts, services, ports, credentials, bugs, or other items used in a cyberattack
1142 identify a movement time
1144 report a movement time
1146 a movement time
1148 identify a movement protocol
1150 report a movement protocol
1152 identify a transfer size difference
1154 report a transfer size difference
1156 transfer size difference
1158 report chain scope
1160 chain scope, e.g., any chain property 712
1162 determine a chain end node characteristic, e.g., from security logs for configuration data or known default settings or a change management log
1164 chain end node characteristic, e.g., what kind of credentials are on a node, whether a chain of transfers ends at a node
1166 any step discussed in the present disclosure that has not been assigned some other reference numeral

CONCLUSION

In short, the teachings herein provide a variety of lateral movement detection and differentiation functionalities which operate in enhanced lateral movement detection systems 210. Cybersecurity is enhanced, with particular attention to automated attacks which include lateral movement searches for administrator credentials 338. Lateral movement 214 between networked computers 102 (also referred to as "nodes") is detected 1102, and automatically and efficiently assessed by a detection tool 210 to distinguish 716 innocent activity from cyberattacks 808. By correlating 902 log 206 data 304, 340 about logins 302 and network 108 traffic 204, the detection tool 210 produces 904 network node sets 306 corresponding to individual movements 214. If a chain 308 can be built 906 from node sets 306 matching an event 208 sequence 330 pattern 316 that tends to be used by attackers 218, then the detection tool 210 reports 910 the chain 308 as an illicit lateral movement 216 candidate 404.

Detection patterns 316 define illicitness grounds 700 such as consistency 706 of data transfer 318 sizes 320, shortness 704 of login intervals 322, use of suspect 708 protocols 314, chain 308 scope 712, and the presence or use of administrator 332 credentials 338. Detection responses 1118 may then isolate 1128 computers 102, inspect 1134 them for malware 810 or tampering 1136, obtain 1138 forensic images 806 for analysis, tighten 1130 exfiltration 1132 filtering, and otherwise mitigate against ongoing or future cyberattacks 808.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware into SIEM software. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system configured for automatic detection of illicit lateral movement, the system comprising:
    a memory;
    a processor in operable communication with the memory, the processor configured to perform steps for detecting illicit lateral movement within a network of computers, the steps including (a) correlating at least login data and network traffic data, thereby producing network node sets, each network node set identifying a login event from a source computer to a target computer and also identifying a data transfer to the target computer, (b) building a chain from at least two of the node sets, the chain representing a sequence of events, the sequence of events including: a second-computer-login into a second computer from a first computer, then a second-computer-data-transfer which transferred data from the first computer to the second computer, then a third-computer-login into a third computer from the second computer, and then a third-computer-data-transfer which transferred data from the second computer to the third computer, wherein a second-computer-data-transfer size of data transferred from the first computer to the second computer and a third-computer-data-transfer size of data transferred from the second computer to the third computer differ by no more than ten percent of the maximum of the two transfer sizes, the sequence of events further characterized by a pattern of consistent protocol choices in that a to-second-computer protocol used to transfer data from the first computer to the second computer and a to-third-computer protocol used to transfer data from the second computer to the third computer are the same protocol, and (c) reporting the chain as an illicit lateral movement candidate.

2. The system of claim 1, further characterized by a pattern of short computer-to-computer movement times in at least one of the following ways:
    a movement time between the second-computer-login and the third-computer-login is less than a time between another login to the second computer and a subsequent login to the third computer;
    a movement time between the second-computer-login and the third-computer-login is less than an average time between at least some logins into computers of the network;
    a movement time between the second-computer-login and the third-computer-login is less than a predetermined threshold; or a movement time between the second-computer-login and the third-computer-login is less than five minutes.

3. The system of claim 1, further characterized by a pattern of administrator logins, in that during the second-computer-login a first user logged into the second computer as an administrator from the first computer, and during the third-computer-login a second user logged into the third computer as an administrator from the second computer.

4. The system of claim 1, wherein building the chain comprises determining that a login between two computers utilized a server message block protocol.

5. The system of claim 1, wherein correlating at least login data and network traffic data comprises correlating a firewall traffic log with a security log of at least one of the computers of the network.

6. The system of claim 1, wherein the network of computers comprises at least one of the following: a cloud network, a local area network, a software-defined network, a client-server network, or a network having at least one trust domain.

7. A method of detecting illicit lateral movement within a computer network, comprising automatically:
    correlating at least login data and network traffic data, thereby producing network node sets, each node set identifying: at least two login times for logins to respective computers of the node set, at least one administrator account on at least one computer of the node set, and at least one data transfer between computers of the node set;
    building a chain from at least two of the node sets, the chain representing a sequence of events, the sequence of events including a login to a first computer as a first user, followed by a data transfer to the first computer, followed by a login to a second computer from the first computer using an administrator credential;
    computing an illicitness score based at least in part on at least one of the following listed grounds: a protocol choice of how to transfer data during at least two transfers collectively involving at least three of the computers in the chain, a chain length indication indicating that more than three computers are in the chain, a presence of multiple chains which share at least one computer, or an anomalousness score based at least in part on previous communications between at least two computers in the chain; and
    reporting the chain as an illicit lateral movement candidate, based on at least the illicitness score.

8. The method of claim 7, wherein the method further comprises computing the illicitness score based at least in part on at least one of the following listed grounds:
    a movement time between logins to adjacent computers in the chain; or
    a difference between a transfer size of data transferred to a computer in the chain and a transfer size of data transferred from that computer.

9. The method of claim 8, wherein computing the illicitness score is based at least in part on at least three of the listed grounds.

10. The method of claim 7, further comprising at least one of the following responses to the reporting:
- isolating one of the computers from communication with the network;
- preventing exfiltration of data from at least one of the computers;
- inspecting at least one of the computers for malware;
- inspecting at least one of the computers for a data integrity violation;
- obtaining a forensic image of volatile memory of at least one of the computers;
- obtaining a forensic image of non-volatile memory of at least one of the computers; or
- hardening at least one of the computers against a cyberattack.

11. The method of claim 7, wherein reporting comprises reporting a movement time between logins to adjacent computers in the chain.

12. The method of claim 7, wherein reporting comprises reporting a difference between a transfer size of data transferred to a computer in the chain and a transfer size of data transferred from that computer.

13. The method of claim 7, wherein reporting comprises identifying a particular data protocol as being used to transfer data to at least two of the computers in the chain.

14. The method of claim 7, wherein reporting comprises reporting at least one of the following:
- an indication that more than two node sets are in the chain;
- a chain length indicating how many computers more than three are in the chain; or
- a chain count indicating how many chains have been built, each chain being based on a sequence of logins using or providing administrator account access.

15. The method of claim 7, comprising obtaining from a trained machine learning model an anomalousness score which is based at least in part on previous communications between at least two computers in the chain.

16. A computer-readable storage medium configured with data and instructions which upon execution by a processor cause a computing system to perform a method of detecting illicit lateral movement within a computer network, the method comprising:
- correlating at least login data and network traffic data, thereby producing network node sets, each node set identifying at least two login times for logins to respective computers of the node set, and also identifying at least one administrator account on at least one computer of the node set;
- building a chain from at least two of the node sets, the chain representing a sequence of events, the sequence of events including a login to a first computer as a first user, followed by a login to a second computer from the first computer using an administrator credential, wherein building the chain comprises at least one of the following: (i) determining that a pattern of consistent computer-to-computer data transfer sizes ends at a computer which contained at least one of the following: a domain administrator credential, or a root user credential, or (ii) determining that a computer X at an end of the chain did not contain any credential which has a higher privilege than a credential used by a previous computer in the chain to login to the computer X; and
- reporting the chain as an illicit lateral movement candidate.

17. The storage medium of claim 16, wherein building the chain comprises determining that a movement time between two login times is less than two minutes.

18. The storage medium of claim 16, wherein building the chain comprises determining that a pattern of consistent computer-to-computer data transfer sizes ends at a computer which contained at least one of the following: a domain administrator credential, or a root user credential.

19. The storage medium of claim 16, wherein building the chain comprises determining that a computer X at an end of the chain did not contain any credential which has a higher privilege than a credential used by a previous computer in the chain to login to the computer X.

20. The storage medium of claim 16, wherein building the chain comprises determining that a login between two computers utilized a server message block protocol.

* * * * *